Dec. 14, 1948.  H. A. BERNREUTER  2,456,171
ELECTRICAL MEASURING INSTRUMENT

Filed March 24, 1945  3 Sheets-Sheet 1

Inventor
Herbert A. Bernreuter
By McCeah, Hirsh & Dickinson
Attorneys

Dec. 14, 1948.  H. A. BERNREUTER  2,456,171
ELECTRICAL MEASURING INSTRUMENT
Filed March 24, 1945  3 Sheets—Sheet 2
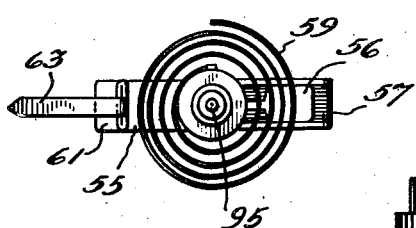
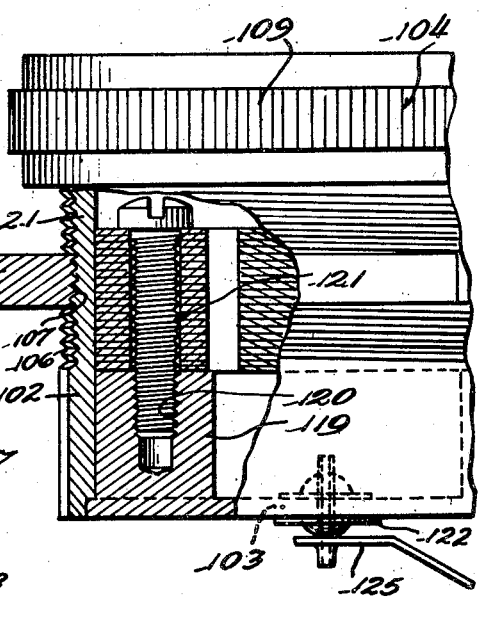
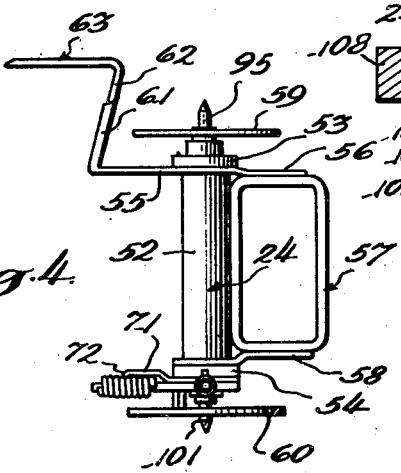
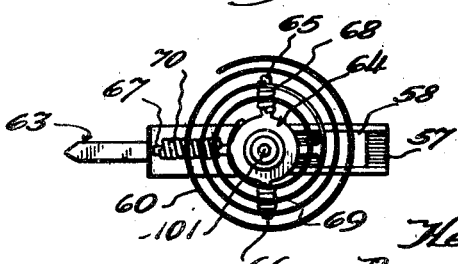
Inventor.
Herbert A. Bernreuter
By McCanna, Hull & Dickinson
Attorneys

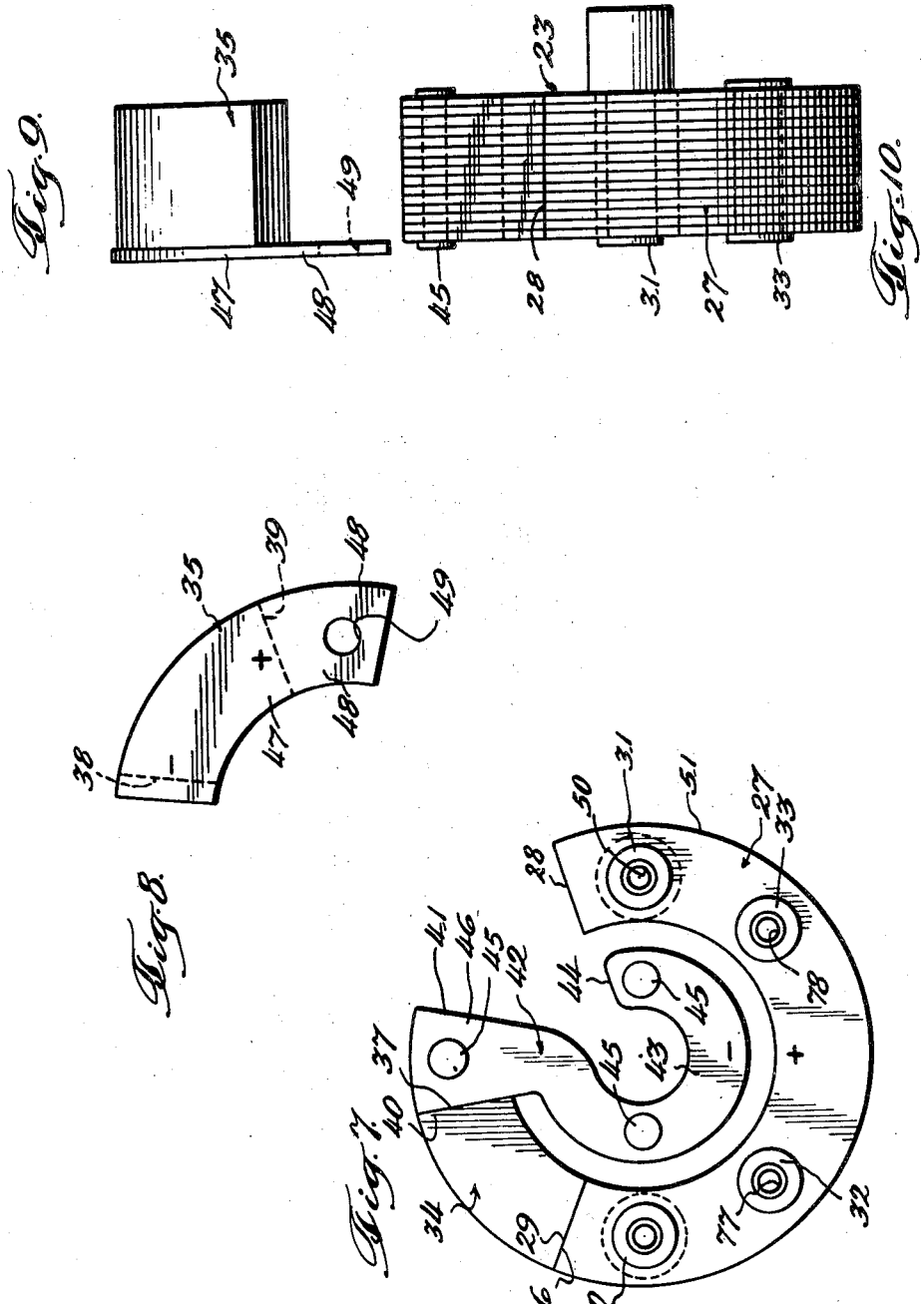

Patented Dec. 14, 1948

2,456,171

UNITED STATES PATENT OFFICE 2,456,171

ELECTRICAL MEASURING INSTRUMENT

Herbert A. Bernreuter, Chicago, Ill., assignor to Simpson Electric Company, Chicago, Ill., a corporation of Illinois Application March 24, 1945, Serial No. 584,571

13 Claims. (Cl. 171—95)

The present invention relates to electrical measuring instruments and is particularly concerned with instruments of the moving coil type.

One of the objects of the invention is the provision of an improved electrical instrument of the moving coil type which has an improved magnetic path structure by means of which a uniformly distributed field is secured and by means of which substantially the total flux of the magnets is used with a very low leakage.

Another object of the invention is the provision of an improved electrical measuring instrument which secures the foregoing advantages and which also has an excellent scale distribution and which may be embodied in very small meters such as a meter having a one-inch diameter which may be used for air craft, aerial cameras, exposure meters, and the like.

Another object of the invention is the provision of an improved magnetic structure for electrical measuring instruments which gives a uniformly distributed field and low leakage of flux in which the two opposed polarity magnets are utilized in one annular magnetic circuit.

Another object of the invention is the provision of an improved electrical measuring instrument structure which is air and liquid proof so that it may be utilized in the tropics where air and moisture must be excluded to prevent the condensation of moisture on the inside and to prevent the growth of fungus over the parts of the meter.

Another object of the invention is the provision of an improved electrical measuring instrument assembly which is sturdy, adapted to be used for a long period of time under the most adverse conditions in the tropics or elsewhere without necessity for repair or replacement, and which can be manufactured at a low cost so that it may be widely used by the public.

Other objects and advantages of the invention will be apparent from the following description and the accompanying drawings, in which similar characters of reference indicate similar parts throughout the several views.

Referring to the three sheets of drawings accompanying this specification:

Figure 3 is a top plan view of the moving coil unit;

Figure 4 is a side elevational view of the moving coil unit;

Figure 5 is a bottom plan view of the moving coil unit;

Figure 6 is a fragmentary elevational view in partial section showing the mode of mounting the instrument unit on the housing;

Figure 7 is a top plan view of the magnetic circuit of the instrument showing the field core, the magnet and moving coil core;

Figure 8 is a similar view of one of the magnets removed from the assembly of Figure 7;

Figure 9 is a side elevational view of the magnet of Figure 8; and

Figure 10 is a side elevational view of the assembled core of Figures 7 and 8.

Figure 2:
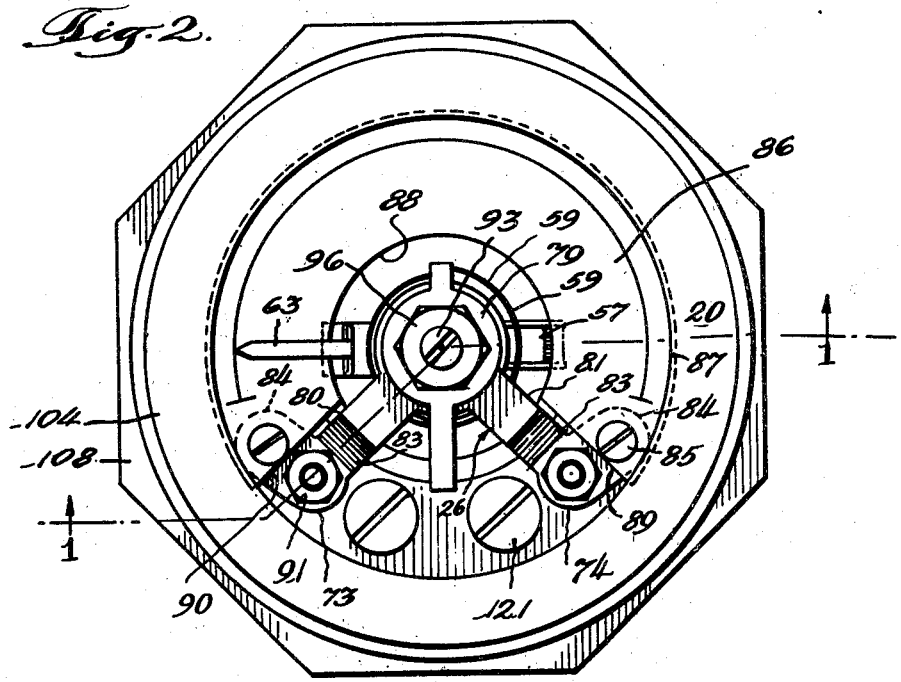
Figure 2 is a top plan view of an instrument embodying the invention drawn on an enlarged scale of 4 to 1.
Figure 1:
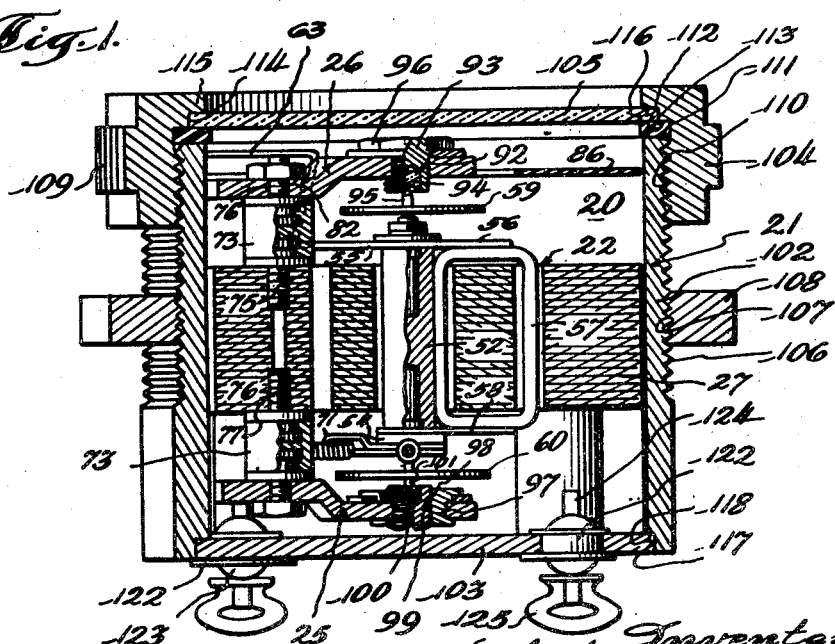
Figure 1 is a transverse sectional view taken on the planes of the line 1—1 of Fig. 2 looking in the direction of the arrows.

Referring to Figs. 1 and 2, 20 indicates in its entirety the electrical instrument assembly which includes the housing 21 and the instrument mechanism 22. The instrument mechanism includes a magnetic core assembly indicated in its entirety by the numeral 23 (Fig. 10), a moving coil unit 24 (Fig. 4), suitable connections, and bridge assemblies 25 and 26 for supporting the moving coil unit on the magnetic core assembly of the instrument.

Referring to Figs. 7 to 10, the magnetic structure of the instrument preferably includes a core of magnetic material 27 of partially annular shape as shown in Fig. 7 and extending from the end wall 28 to end wall 29. This core may be constructed of a plurality of laminations of magnetic material such as silicon steel and the laminations may be secured together by a plurality of rivets 30—33 passing through through-bores and riveted over at the top and bottom. The rivets 30—33 may consist of tubular rivets, if desired, to provide bores which may be threaded for securing other parts.

The exact portion of the periphery occupied by the magnetic core 27 may vary in different instruments but in the present embodiment this core occupies more than 180° of the annular magnetic circuit which is completed by means of two magnets 34, 35, preferably of magnetic material of high coercive force such as Alnico. In some embodiments of the invention the laminated core 27 may be replaced with a solid core of low reluctance such as soft iron or a soft iron core of powdered sintered material.

The magnets 34 and 35 comprise sectors of an annulus which is formed on the same inner and outer radii of curvature as the annular field core 27. Each magnet 34, 35 is provided with the flat radial end surfaces 36, 37, 38, 39 which fit against the end surfaces 28 and 29 of the field core 27 and against the lateral radially extending flat surfaces 40 and 41 of the moving coil core unit 42. The moving coil core unit 42 may also consist of a laminated member of magnetic material such as soft iron laminations or a solid soft iron body which is formed with a partially annular portion 43 having an opening at 44 to permit the insertion of the moving coil.

The laminations may be secured together by rivets 45 and the partially annular portion 43 has a radially extending supporting arm portion 46 which also forms a sector of the annular magnetic circuit. With the two magnets 34 and 35, the supporting portion 46 of the moving coil core is adapted to complete the gap between the end surfaces 28 and 29 of the field core 27 to make a complete annulus in which the magnets are included.

The magnets 34 and 35 are preferably arranged in the circuit in opposed relation, that is, the positive pole of magnet 34 may be adjacent the surface 29 and the positive pole of magnet 35 may be located adjacent the surface 28 of the field core 27. Thus, both of the negative poles bounded by surfaces 37, 38 will be located adjacent the surfaces 40 and 41 of the moving coil core. The polarity of the annular portion 43 of the moving coil core will be negative and the polarity of all of the adjacent part of the field core 27 will be positive.

The core 34 is preferably soldered to the laminated field core 27 with the surfaces 29 and 36 in contact and also soldered to the moving coil unit 42 with the surfaces 40 and 37 in contact.

The magnet sector 35 may be provided with a brass plate 47 soldered to its top and adapted to overlap the adjacent portion 46 of the moving coil core unit 42 and the adjacent portion of the field core 27. The overlapping portion 48 of this plate may be provided with a registering aperture 49 for registry with the threaded bore 50 in the rivet 31 so that this sector 35 may be secured in place by means of a suitable screw bolt.

In other embodiments of the invention the last section of the core may be held in place by engagement with the inner wall of the adjacent housing which may fit the outer cylindrical surface 51 of the magnetic circuit assembly quite closely.

It should be noted that the field core 27 and magnets 34 and 35 are preferably rectangular in shape and are uniform in thickness and radial width so as to provide a core of uniform cross-section. The annular portion 43 of the moving coil core is also preferably rectangular in cross section and of uniform thickness and uniform radial width so that its cross section is uniform; and the moving coil core unit 42 has its annular portion 43 located at a uniform air gap with respect to the outer annular field structure 27. Thus the air gap between these core is also of uniform annular spacing.

The moving coil unit is illustrated in Figs. 3 to 5 and it comprises a substantially cylindrical plastic shaft 52 having suitable threaded inserts at each end for receiving the reduced threaded portion of the pintle members 53, 54. The upper pintle member 53 may clamp the pointer bracket 55 to the shaft 52 and the pointer bracket may be extended toward the right to provide an attaching flange 56 for supporting the upper end of the movable coil 57. The movable coil 57 is supported at the bottom by a similar bracket 58 which is secured to shaft 24 by means of pintle member 54.

Movable coil 57 may consist of a suitable rectangular spool of light metal or plastic material which supports a multiplicity of turns of fine insulated wire the ends of which are attached to the hair springs 59 and 60 carried by the pintle assemblies 53 and 54 and insulated from each other by the insulating shaft 52. The pointed bracket 55 preferably extends radially and is bent upwardly at 61 at an acute angle, the upwardly extending portion 61 embracing and supporting the attaching flange 62 of a pointer 63 the end portion of which extends horizontally with respect to the axis of the movement.

At its lower end the pintle assembly 54 also supports a balance weight assembly 64 preferably of the type disclosed in the prior application of Ray Simpson, Serial No. 524,801, filed March 2, 1944, now Patent No. 2,433,165, issued December 23, 1947. This assembly comprises a light metal plate with a pair of laterally projecting arms 65, 66 and a third longer arm 67 which extends in the same direction as the pointer and diametrically opposite to the moving coil 57. Each of these arms 65—67 slidably supports a tightly wound helical coil spring 68, 69, 70 of appropriate length, the spring being held in place by a spring arm 71 having a downwardly turned knife edge 72 engaging between the convolutions of the spring.

The springs may be adjusted by sliding the spring longitudinally by lifting the spring arm 71, or by rotating the spring while the knife edge 72 engages between the convolutions of the spring after the manner of a screw thread.

The magnetic circuit assembly 23 supports a pair of bridge posts 73, 74 at its top and a similar pair 73, 74 at the bottom. Each bridge post may consist of a molded plastic member with upper and lower threaded bolt inserts 75, 76 by means of which the post is secured to the magnetic core assembly and to the upper and bottom bridge members.

The attachment to the magnetic core assembly may be made by threading the member 76 into the threaded bores 77, 78 of rivets 32, 33 and the same mode of securement may be used for the threaded members 76 of the bottom posts 73 and 74.

The bridge members 25 and 26 may consist of brass plates comprising a central circular portion 79 which carries a pair of radially extending arms 80 and 81 spaced from each other an angular distance which causes their bores 82 to register with the threaded members 76' that are carried by the bridge posts 73. In order to give more room for the moving coil unit and to utilize the same bridge for supporting the dial, each bridge arm 80, 81 is offset downwardly and outwardly at 83 adjacent the threaded members 76 and each arm is provided with a peripherally extending flange 84 having an aperture for receiving a screw bolt 85 which secures the dial plate 86 to the assembly.

The dial plate may consist of a plate of thin sheet brass of substantially circular outline 87 and having a circular portion cut out at the inner outline 88 surrounding the movement and clearing the upwardly extending portions 61 and 62 of the needle bracket and needle. A segment of the dial plate is also cut out, leaving the radial boundaries 89 and 90 at each of the sides of the bridge arms 83.

The bridges 25 and 26 may be secured in place by means of nuts 91 on the outwardly projecting threaded members 76 at the top and bottom of the assembly. The upper bridge is provided with a centrally located threaded bore 92 for receiving the upper jewel screw 93 having a jewel 94 with a conical depression to provide a bearing for the conical end of the upper pintle 95. A lock nut 96 maintains the adjustment of jewel screw 93.

The lower bridge 25 also has a bore for supporting a bushing 97 which may be riveted over in the bore and which is provided with a threaded bore 98 for supporting a similar lower jewel screw 99 having a jewel 100 for supporting the lower pintle 101.

One end of each hair spring 59, 60 is anchored to the moving coil 57 and the other end is suitably anchored on a part carried by the upper and lower bridges 26, 25.

The moving coil unit 24 is mounted in place with its moving coil 57 surrounding the core portion 43 before the sector 35 is secured in place, closing the magnetic circuit.

The entire assembly is preferably mounted in an hermetically sealed air-tight and liquid-tight housing 21. This housing may consist of a cylindrical housing member 102, base plate 103, cover 104, and transparent window 105. The cylindrical housing member 102 is preferably provided with threads 106 over the major forward portion of its outer surface and these threads are adapted to be engaged by the complementary threads 107 of an annular nut 108 which may be used to mount the instrument upon a panel or other support, the panel being clamped between nut 108 and cover 104.

Cover 104 may consist of an annular metal member formed with a knurled substantially cylindrical surface 109 and provided with inner threads 110 complementary to the threads 106 on the housing member 102. Cover 104 has a non-threaded counterbore 111 for receiving an annular gasket 112 of a soft resilient material such as rubber, synthetic rubber, or the composition which may be purchased on the open market under the trade name of "Neoprene." The gasket 112 is preferably rectangular in cross section and it not only engages the annular surface 113 on the cover but it engages the inner surface of the glass 105.

The cover 104 also has a counterbore 114 for receiving the circular window glass 105 which may be of any suitable glass or transparent heat-moldable plastic and the cover has an inwardly extending annular flange 115, the inner surface 116 of which engages the outer surface of the window 105. When the cover 104 is threaded tightly on the housing member 102, this end of the housing is effectively sealed against passage of air, liquid or moisture of any kind.

The opposite end of the housing member 102 is provided on its inner surface with a counterbore 117 and an annular surface 118 for receiving and engaging the base plate 103. Base plate 103 may consist of a metal plate of the same non-magnetic metal as is used for housing member 102 and cover 104 such as brass.

The base plate 103 consists of a substantially circular metal plate provided with the inwardly extending lugs 119 having threaded bores 120 for receiving the screw bolts 121 which pass through the field core assembly to secure the instrument movement to the housing. Thus the entire assembly of the instrument movement is mounted upon the base plate 103 to be removed as a unit.

The base plate 103 is preferably provided with the insulating glass terminal sleeves 122 which may be suitably joined or welded to the metal cover plate 103 and to the electrodes 123 which pass through these sleeves and are provided with connectors 124 on the inside and connectors 125 on the outside. The inner electrodes 124 are of course connected to the moving coil while the outer electrodes 125 serve to connect the instrument in circuit.

The base plate 103 is soldered to the metal casing member 102 all around the joint between the base plate and this housing member so as to provide a liquid and gas tight closure at this end of the housing. The dial plate 86 is of course provided with a suitable scale with scale divisions and numerical indicia and the present movement may be utilized with suitable multipliers for all of the instruments in which such moving coil units are employed.

The operation of the electrical instrument will be apparent from the description of its parts. The pintles 95 and 101 of the moving coil being located at the center of generation of the moving coil core portion 43 and the zero position of the pointer being located with the moving coil adjacent the end 44, it will be apparent that the moving coil may move through an arc of substantially 210°, giving a large scale deflection. The magnetic field structure gives a very uniformly distributed field of flux and a good scale distribution and utilizes substantially the total flux of the magnet with a minimum amount of leakage.

The instrument may be constructed in a very small size such as a one-inch diameter meter, so that it can be used for small instruments such as exposure meters, and is equally adaptable for aircraft, aerial cameras, and many other uses.

The same movement can be used in a larger instrument with a longer pointer and a larger scale with a high sensitivity. The present meter structure is very sturdy and may be used under the most adverse conditions with good results.

The housing which has its electrodes sealed in the base plate against passage of liquid or air is capable of excluding water, moisture and all other deleterious influences so as to substantially prevent the growth of fungus over the parts of the meter in the housing in the tropics and to prevent the ingress of moisture which would condense on the inside.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In an electrical instrument, the combination of a magnetic circuit structure including an annular outer magnetic circuit, a partially annular inner core and a radially inwardly extending portion supporting said inner core, said inner core having an opening, said outer circuit including a pair of magnets disposed with polarity opposed on both sides of said inwardly extending portion, a pair of bridge posts of molded plastic insulating material and having threaded metal inserts for securement to said field structure on the upper side of said field structure, and similar bridge posts on the lower side of said field structure, an upper bridge and a lower bridge, both of said bridges comprising a central portion and a pair of radially extending supporting arms carried by said bridge posts, and a moving coil unit having its pintles pivotally supported by said bridges, said moving coil unit including a coil surrounding said inner core portion of the magnetic circuit.

2. In an electrical instrument, the combination of a magnetic circuit structure including an annular outer magnetic circuit, a partially annular inner core and a radially inwardly extending portion supporting said inner core, said inner core having an opening, said outer circuit including a pair of magnets disposed with polarity opposed on both sides of said inwardly extending portion, a pair of bridge posts of molded plastic insulating material and having threaded metal inserts for securement to said field structure on the upper side of said field structure, and similar bridge posts on the lower side of said field structure, an upper bridge and a lower bridge, both of said bridges comprising a central portion and a pair of radially extending supporting arms carried by said bridge posts, and a moving coil unit having its pintles pivotally supported by said bridges, said moving coil unit including a coil surrounding said inner core portion of the magnetic circuit, said moving coil unit including an initially plastic heat moldable shaft member having metal inserts at its ends for supporting pintles.

3. In an electrical instrument, the combination of a magnetic circuit structure including an annular outer magnetic circuit, a partially annular inner core and a radially inwardly extending portion supporting said inner core, said inner core having an opening, said outer circuit including a pair of magnets disposed with polarity opposed on both sides of said inwardly extending portion, a pair of bridge posts of molded plastic insulating material and having threaded metal inserts for securement to said field structure on the upper side of said field structure, and similar bridge posts on the lower side of said field structure, an upper bridge and a lower bridge, both of said bridges comprising a central portion and a pair of radially extending supporting arms carried by said bridge posts, and a moving coil unit having its pintles pivotally supported by said bridges, said moving coil unit including a coil surrounding said inner core portion of the magnetic circuit, said moving coil unit including an initially plastic heat moldable shaft member having metal inserts at its ends for supporting pintles, and threaded members carrying said pintles.

4. In an electrical measuring instrument, the combination of a partially annular core of paramagnetic material of substantially uniform cross-sectional area and shape and extending over more than one hundred and eighty degrees, with a pair of magnets having substantially the same cross-sectional area and shape, the said magnets being joined to the free ends of the core and forming a further extension of said annular core in the annular direction, with a moving coil core comprising a member of paramagnetic material having a supporting portion which fits between the said magnets and completes the annulus of which the magnets and annular core are a part, said supporting portion extending radially inward and carrying a partially annular portion of uniform cross-sectional shape and area which terminates at an opening opposite one of said magnets and which is uniformly spaced from said annular core, whereby a moving coil may be mounted with one of its sides axially located, and said coil embracing the moving coil core for revolution of the moving coil in an orbit within said annular core.

5. In an electrical measuring instrument, the combination of a partially annular core of paramagnetic material of substantially uniform cross-sectional area and shape and extending over more than one hundred and eighty degrees, with a pair of magnets having substantially the same cross-sectional area and shape, the said magnets being joined to the free ends of the core and forming a further extension of said annular core in the annular direction, with a moving coil core comprising a member of paramagnetic material having a supporting portion which fits between the said magnets and completes the annulus of which the magnets and annular core are a part, said supporting portion extending radially inward and carrying a partially annular portion of uniform cross-sectional shape and area which terminates at an opening opposite one of said magnets and which is uniformly spaced from said annular core, whereby a moving coil may be mounted with one of its sides axially located, and said coil embracing the moving coil core for revolution of the moving coil in an orbit within said annular core, the said annular core being formed of a plurality of laminations secured together by tubular rivets, and the said magnets being secured to a thin lamination which is arranged in overlapping relation to the predetermined laminations of said annular core.

6. In an electrical measuring instrument, the combination of a partially annular core of paramagnetic material of substantially uniform cross-sectional area and shape and extending over more than one hundred and eighty degrees, with a pair of magnets having substantially the same cross-sectional area and shape, the said magnets being joined to the free ends of the core and forming a further extension of said annular core in the annular direction, with a moving coil core comprising a member of paramagnetic material having a supporting portion which fits between the said magnets and completes the annulus of which the magnets and annular core are a part, said supporting portion extending radially inward and carrying a partially annular portion of uniform cross-sectional shape and area which terminates at an opening opposite one of said magnets and which is uniformly spaced from said annular core, whereby a moving coil may be mounted with one of its sides axially located, and said coil embracing the moving coil core for revolution of the moving coil in an orbit within said annular core, the said annular core being formed of a plurality of laminations secured together by tubular rivets, and the said magnets being secured to a thin lamination which is arranged in overlapping relation to the predetermined laminations of said annular core, and the said magnet which is opposite the opening in the moving coil core being removable for insertion and removal of the moving coil.

7. In an electrical instrument, a moving coil unit comprising a substantially cylindrical column of initially plastic moldable material, said column being provided at each of its ends with axially located metal threaded inserts anchored therein, a bracket mounted on each of said inserts and clamped to said inserts by upper and lower pintle members, said brackets having radially extending extensions, and a moving coil disposed in a plane extending radially from said column and engaging the extensions of said brackets to which said moving coil is secured at each of its ends.

8. In an electrical instrument, a moving coil unit comprising a substantially cylindrical column of initially plastic moldable material, said column being provided at each of its ends with axially located metal threaded inserts anchored therein, a bracket mounted on each of said inserts and clamped to said inserts by upper and lower pintle members, said brackets having radially extending extensions, and a moving coil disposed in a plane extending radially from said column and engaging the extensions of said brackets to which said moving coil is secured at each of its ends, said moving coil consisting of a substantially rectangular spool supporting a multiplicity of turns of fine insulated wire, and said spool being elongated in the direction of said column, and having its end portions secured to said bracket extensions.

9. In an electrical instrument, a moving coil unit comprising a substantially cylindrical column of initially plastic moldable material, said column being provided at each of its ends with axially located metal threaded inserts anchored therein, a bracket mounted on each of said inserts and clamped to said inserts by upper and lower pintle members, said brackets having radially extending extensions, and a moving coil disposed in a plane extending radially from said column and engaging the extensions of said brackets to which said moving coil is secured at each of its ends, the uppermost of said brackets also having an oppositely extending extension with an upwardly turned end supporting a pointer.

10. In an electrical instrument, the combination of an annular magnetic circuit structure provided with a radially inwardly extending arm having a partially annular core adapted to be located inside a moving coil, with a pair of bridge posts of molded plastic insulating material, and having upper and lower threaded metal inserts for securement to one side of the magnetic circuit structure, similar bridge posts on the other side of said magnetic circuit structure, and an upper and lower bridge, each of said bridges comprising a central portion and a pair of radially extending supporting arms carried by said bridge posts, said central portion being apertured and threaded to receive a pintle bearing.

11. In an electrical instrument, the combination of an annular magnetic circuit structure provided with a radially inwardly extending arm having a partially annular core adapted to be located inside a moving coil, with a pair of bridge posts of molded plastic insulating material, and having upper and lower threaded metal inserts for securement to one side of the magnetic circuit structure, similar bridge posts on the other side of said magnetic circuit structure, and an upper and lower bridge, each of said bridges comprising a central portion and a pair of radially extending supporting arms carried by said bridge posts, said central portion being apertured and threaded to receive a pintle bearing, said radial supporting arms being downwardly offset toward said bridge posts, whereby the central portion is supported in a higher plane and each of said arms having a laterally extending portion for supporting a dial plate in a lower plane.

12. An electrical instrument housing comprising a substantially cylindrical housing member enclosed at its rear end by means of an end wall supporting a pair of insulating glass terminal sleeves containing terminals, said sleeves being welded to said end wall, said end wall and housing being constructed of metal, and said housing being threaded over its forward end, a bezel ring having a threaded bore adapted to receive the open end of the housing and to be threaded on said housing, said ring having an inwardly extending flange overlapping the end of the housing, a compressible fluid-tight gasket engaging the end of the housing and engaging a transparent window, said window being clamped against the gasket by said inwardly extending flange on said bezel ring, whereby the housing may be made hermetically sealed.

13. An electrical instrument housing comprising a substantially cylindrical housing member enclosed at its rear end by means of an end wall supporting a pair of insulating glass terminal sleeves containing terminals, said sleeves being welded to said end wall, said end wall and housing being constructed of metal, and said housing being threaded over its forward end, a bezel ring having a threaded bore adapted to receive the open end of the housing and to be threaded on said housing, said ring having an inwardly extending flange overlapping the end of the housing, a compressible fluid-tight gasket engaging the end of the housing and engaging a transparent window, said window being clamped against the gasket by said inwardly extending flange on said bezel ring, whereby the housing may be made hermetically sealed, said bezel ring having an outer noncircular formation adapted to receive a wrench or the like and a second inwardly threaded ring mounted on the threads of said housing and adapted to be used to clamp a panel between the rear edge of the bezel ring and said second ring.

HERBERT A. BERNREUTER.

REFERENCES CITED

The following references are of record in the file of this patent:

UNITED STATES PATENTS

| Number | Name | Date |
|---|---|---|
| 2,066,942 | Massa, Jr. | Jan. 5, 1937 |
| 2,221,618 | Stickney | Nov. 12, 1940 |
| 2,275,880 | Arey | Mar. 10, 1942 |
| 2,320,946 | Madden | June 1, 1943 |
| 2,346,521 | Triplett | Apr. 11, 1944 |
| 2,367,950 | Lenehan | Jan. 23, 1945 |
| 2,394,724 | Snorek | Feb. 12, 1946 |